United States Patent [19]

Kim et al.

[11] Patent Number: 4,602,822
[45] Date of Patent: Jul. 29, 1986

[54] APPARATUS FOR VARYING ECCENTRICALLY OR CENTRICALLY THE SHAFT OF THE BICYCLE WHEEL

[76] Inventors: Joo H. Kim, 2551 Loop 35, #701, Alvin, Tex. 77511; Rack K. Choi, 208 Soong-Wuy 2-dong, Nam-ku, Inchoen City, Kyungkido, Rep. of Korea

[21] Appl. No.: 648,907
[22] Filed: Sep. 7, 1984
[51] Int. Cl.$^4$ .................. B60B 27/00; B62M 1/00
[52] U.S. Cl. .................. 301/1; 301/105 B; 280/229
[58] Field of Search .................. 301/1, 108 R, 108 B, 301/105 B; 280/229; 180/905, 906

[56] References Cited

U.S. PATENT DOCUMENTS

| | | | |
|---|---|---|---|
| 423,051 | 3/1890 | Haven | 301/1 |
| 605,182 | 6/1898 | Johnston | 280/229 |
| 654,182 | 7/1900 | Rupsch | 301/1 |
| 1,679,819 | 8/1928 | Fageol | 280/229 |
| 3,292,946 | 12/1966 | Melson | 280/229 |
| 3,799,581 | 3/1974 | Munn | 280/229 |

Primary Examiner—David A. Scherbel
Attorney, Agent, or Firm—Townsend and Townsend

[57] ABSTRACT

Disclosed is an apparatus for varying eccentrically or centrically the shaft of the bicycle wheel in order that the bicycle can run up and down like horseback riding beside regular level riding. The apparatus has an eccentric hub including a shaft housing formed integrally in eccentric position between two hub discs having an opening and a shaft penetrated through said shaft housing, two circular supporting plates coupled rigidly each other by three connecting rods to reserve revolvably said eccentric hub therebetween, each which has a hub disc housing formed in its eccentric position said hub disc housing has a relatively large hole on its centric portion to exposure the shaft and also a plurality of openings corresponding to different eccentric positions on its circumference of circle, and a resettable spring loaded rod for locking the eccentric hub between the hub disc housings of the circular supporting plates by passing through the openings in alignment with each other.

3 Claims, 6 Drawing Figures

APPARATUS FOR VARYING ECCENTRICALLY OR CENTRICALLY THE SHAFT OF THE BICYCLE WHEEL

BACKGROUND OF THE INVENTION

1. Technical Field

This invention relates to an apparatus for varying eccentrically or centrically the shaft of the bicycle wheel, particularly an apparatus for shifting the bicycle shaft from its centric position to one of different eccentric positions and vise versa.

2. Background Art

Generally, all of the bicycles have unvariable shaft. Therefore, if the bicycle shaft is permanently fixed to the eccentric position by application of a simple principle, it is possible to ride the bicycle only in wavy manner up and down, but not possible for regular level riding, and for the dual purposes, two separate bicycles are necessary, one for wavy riding up and down, and other for regular level riding.

The object of this invention is to overcome such inconvenient and uneconomical feature, to provide an apparatus which is invented by renovation the shaft mechanism in such a way that the shaft in the centric position can be simply shifted to one of the different eccentric positions and also can be simply reset back to the centric position, thereby a single bicycle can serve the dual purposes.

SUMMARY OF THE INVENTION

In accordance with the invention, there is provided an eccentric hub having a shaft housing formed integrally in eccentric position between two hub discs and a shaft penetrated through the shaft housing, which is rotatively mounted between two hub disc housings steped outwardly in eccentric position of each circular supporting plates, and can be rotated manually to adjust eccentricity of the shaft. There is also provided a plurality of openings formed on the periphery of said hub disc housings and an openings formed at the bottom side of said hub discs to set the selected eccentricity of the shaft. There is also provided a resettable spring loaded rod for setting through the openings of the hub disc housings and hub discs to prevent said eccentric hub from revolving in said disc housings.

BRIEF DESCRIPTION OF THE DRAWINGS

This object and other objects and characteristics of the invention will be understood completely by the detailed description of the prefered embodiment as explained hereinafter with reference to the accompanied drawings.

FIG. 3A is a side elevation and FIG. 3B is a partial sectional view cut along line X—X' of FIG. 3A:

FIG. 4A is a side elevation and FIG. 4B is a partial sectional view cut along line Y—Y' of FIG. 4A.

In the drawings, it should be noted that the same reference numerals are designated the same parts as a matter of convenient of explanation.

FIG. 1 shows a perspective view of the bicycle wheel having an eccentrically variable H in accordance with the invention and FIG. 2 shows a perspective view of main part of the invention of FIG. 1, disassembled only the one side of the hub H.

Figure 1:
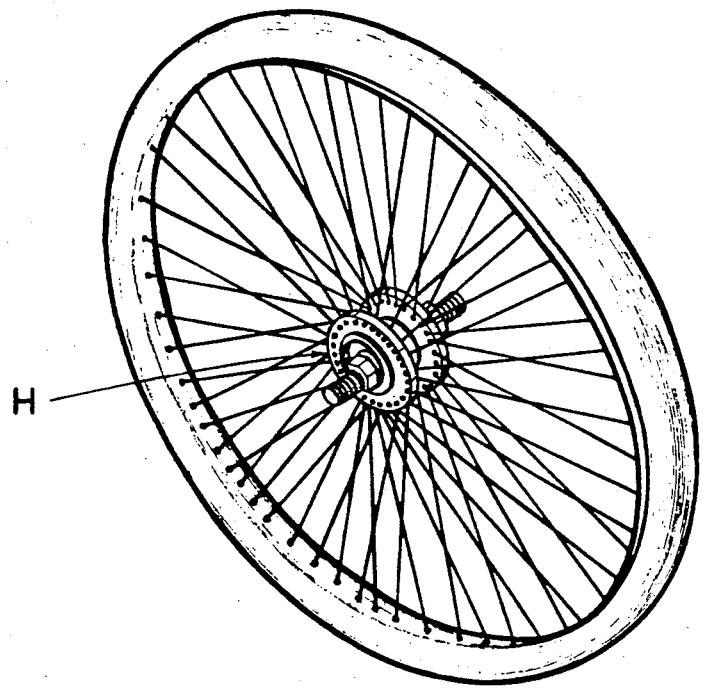
FIG. 1 is a perspective view of a bicycle wheel having an eccentrically variable hub by a prefered embodiment of the invention.
Figure 2:
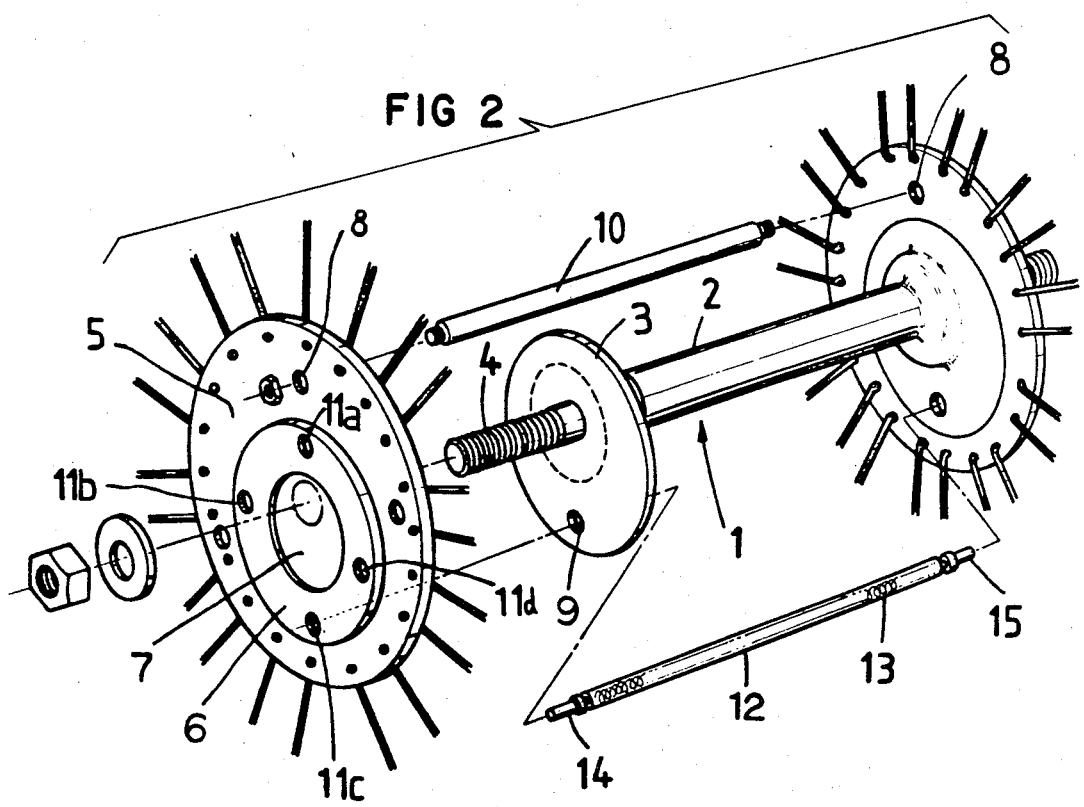
FIG. 2 is a perspective view of main part of FIG. 1, disassembled only the one side.

Here, it can be seen that the hub H comprises an eccentric hub 1 having a shaft housing 2 formed integrally in eccentric position between two hub discs 3 and a shaft 4 penetrated through the shaft housing 2, said eccentric hub 1 being supported rotatably in a fixed position on the shaft 4 and said each hub discs 3 having an opening 9, two circular supporting plates 5 coupled each other by three connecting rods 10 to reserve revolvably the eccentric hub 1 therebetween, each which has a hub disc housing 6 steped outwardly in eccentric position below its centric position and a relatively large hole 7 formed on smaller cocentric circle than one of the hub disc housing 6, said circular supporting plates 5 and said hub disc housing 6 having three openings 8 and four openings 11a, 11b, 11c on their circumference, respectively, and a resettable spring loaded rod 12 for setting through the openings of the hub disc housings and hub discs 3 to prevent the eccentric hub 1 from revolving between the disc housings 6.

More detailedly, the eccentric hub 1 consists of a shaft housing 2, two hub discs 3 and a shaft 4. The shaft housing 2 is fixed integrally in a desirable eccentric position between the two hub discs 3 and the shaft 4 is penetrated through the shaft housing 2 so that the eccentric hub 1 can be rotated in a fixed position on the shaft 4. Further, the penetrated shaft 4 has the exposured screw portions on its both sides to fix it by nut and washer on the bicycle body frame 17 as shown in dotted line in FIG. 4B and the eccentric hub discs 3 have also an opening 9 for setting them on the circular supporting plates 5, respectively which is formed at the bottom part from the center thereof.

Furthermore, the eccentric hub 1 as described above is reserved revolvably between two circular supporting plates 5 which are coupled with each other by fixing through the openings 8 with for example, three connecting rods 10 and nut and washer as shown only one in the drawings.

To be reserved safely the eccentric hub 1 between the circular supporting plates 5, each plates 5 has a hub disc housing 6 and a relatively large hole 7. The hub disc housing 6 is steped outwardly in eccentric position of the plates 5 to reserve the hub disc 3 and also the relatively large hole 7 is formed on the cocentric circle of the hub disc housing 6 and has more small size than one of the hub disc housing 6 such that when the eccentric hub 1 is rotated manually to adjust the eccentricity of the shaft 4, the shaft penetrated therethrough can be rotated without any interference.

Furthermore, each hub disc housing 6 has for example, four openings 11a, 11b, 11c and 11d on its circumference of circle. The opening 11a is to lock the shaft 4 in centric position of the bicycle wheel and the remaining openings 11b, 11c and 11d are to lock it in different eccentric positions of the same, which can be selected by user. The number of the openings depends on the number of desirable eccentricities which may be selected.

Therefore, to keep the eccentric hub 1 in a desired position of a centric or other different eccentric positions of the shaft 4, it can be accomplished by rotating the eccentric hub 1 between the two hub disk housing 6 so that the opening 9 of the eccentric hub disc 3 is in alignment with any one of the openings 11a, 11b, 11c and 11d of the disc housing 6 and then by setting a spring loaded rod 12 as explained hereinafter to pass through the openings therebetween.

The spring loaded rod 12 has a spring 13 loaded therein along the longitudinal direction and two studs 14, 15 formed on its both sides so that it can be bended resiliently and flexibly to set or unset the openings.

The operation and effects of the hub having the eccentrically variable shaft as aforementioned in accordance with the invention will be understood apparently from the following description explained with reference to FIGS. 3A, 3B, 4A and 4B.

Figure 3A:
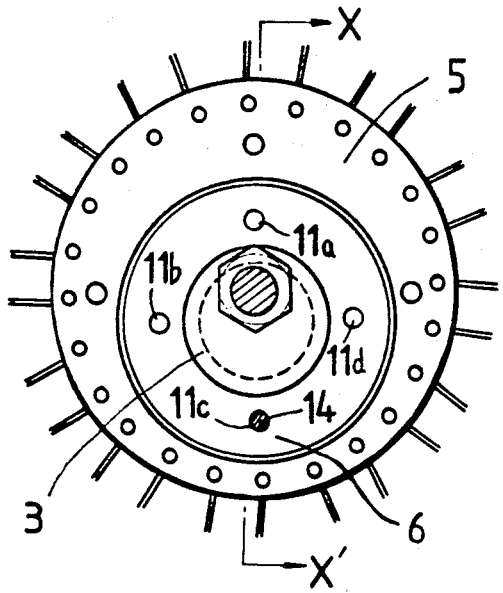
FIGS. 3A and 3B are views showing when the shaft is in a centric position.
Figure 3B:
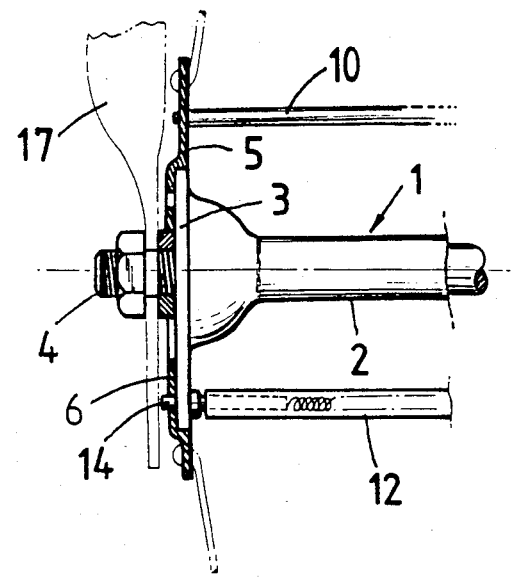

FIG. 3A shows a side elevation of the assembled bicycle hub H when the shaft 4 is in a centric position and FIG. 3B shows a partial sectional view of FIG. 3A.

Here, it can be seen that since the circular supporting plate 5 has the hub disc housing 6 in eccentric position and the eccentric hub disc 3 in eccentric position, to keep the shaft 4 in centric position, the eccentric hub 1 must be rotated to offset each other their eccentricity, namely, to remain in centric position that the shaft 5 is in upper position of the relatively hole 7 and fixed each other by the spring loaded rod 12 so that the eccentric hub disc 3 is not moved from the centric position into other eccentric positions and secured safely in the centric position.

FIG. 3B, it can be seen apparently that the two circular plates 5 are rigidly fixed by the three coupling rods 10 as shown only one in the drawings to maintain always a constant distance therebetween so that the eccentric hub 1 is rotated freely on the shaft 4 in the unlocked state of the spring loaded rod 12, and also the studs 14, 15 of the spring loaded rod 12 are past through the opening 11c of the hub disc housing 6 and the opening 9 of the eccentric hub disc 3 so that the eccentric hub 1 is not rotated in the disc housing 6. Therefore, when the bicycle wheel is in FIG. 3A and FIG. 3B, the bicycle can ride in normal state, namely always in the same level.

Figure 4A:
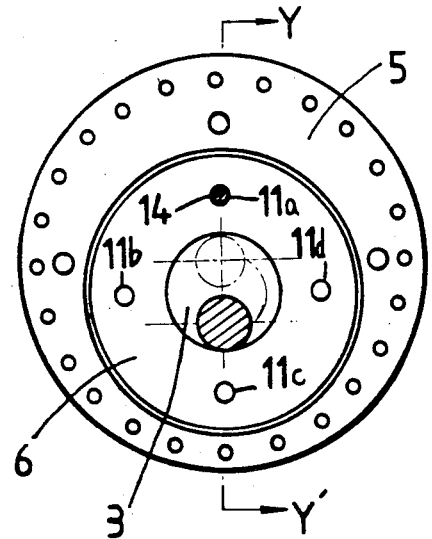
FIGS. 4A and 4B are views showing when the shaft is in an eccentric position.
Figure 4B:
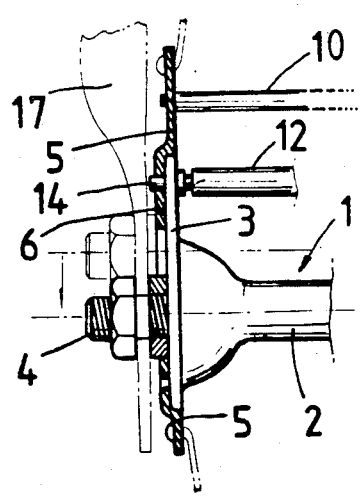

FIG. 4A shows also a side elevation of the assembled bicycle hub when the shaft is in a eccentric position and FIG. 4B shows also a partial sectional view of FIG. 4A. Here, it can be seen apparently that the eccentric hub 1 is rotated so that the shaft 4 is in eccentric position, namely the lower position below the centric position as shifted into the direction of the arrow in the drawing. At this time, the spring loaded rod 12 is resetted in position of the upper side of the hub to keep safely the position. Since the remaining portions are also the same as ones of the FIG. 3A and FIG. 3B, the detailed explanation is omitted.

In this assembled state, the bicycle can ride in wavy manner up and down since the wheel has an eccentric shaft.

As aforementioned, in accordance with the invention, the shaft 4 of the hub H can be shifted easily and optionally into a desired position of the centric position 11a or other three different eccentric positions 11b, 11c and 11d by pulling out manually the spring loaded rod 12 and then rotating the eccentric hub 1 into a desired position and then resetting to lock again the spring loaded rod 12 through the openings in alignment with each other, thereby as a single bicycle, user can enjoy subsidarily effective exercise of whole body such that the bicycle runs up and down like horseback riding.

It should be noted that the hub H in accordance with the invention may installed in either one of the front or back wheel or both of wheels.

What is claimed is:

1. An apparatus for varying eccentrically or centrically the shaft of the bicycle wheel comprising an eccentric hub including a shaft housing formed integrally in eccentric position between two discs and a shaft penetrated through said shaft housing, said each hub disc having an opening formed in a lower part from the centric position, two circular supporting plates coupled with each other by at least three connecting rods to reserve revolvably said eccentric hub therebetween, said each plates has a hub disc housing which is formed in eccentric position to reserve said hub disc, said hub disc housing has at least four openings corresponding to different eccentric positions on its circumference and a relatively large hole formed on the centric portion of said hub disc housing to exposure said shaft, and a resettable spring loaded rod for locking said eccentric hub between said circular supporting plates by passing through said hub disc and hub disc housing openings in alignment with each other to keep in a position of said different eccentric positions.

2. An apparatus in accordance with claim 1, wherein said eccentric hub is able to be rotated manually between said disc housings and said opening of said hub disc is able to be in alignment with each openings of said hub disc housing to be locked by said spring loaded rod when resetting.

3. An apparatus in accordance with claim 1, wherein said resettable spring loaded rod has a spring in its longitudinally direction and studs on its both sides and is bendable flexibly and resiliently to lock and unlock said aligned hub disc and hub disc housing openings.

* * * * *